United States Patent
Ito

(10) Patent No.: US 10,931,832 B2
(45) Date of Patent: Feb. 23, 2021

(54) INFORMATION PROCESSING APPARATUS, CONTROL METHOD OF THE SAME, AND STORAGE MEDIUM

(71) Applicant: CANON KABUSHIKI KAISHA, Tokyo (JP)

(72) Inventor: Hiroki Ito, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/722,260

(22) Filed: Dec. 20, 2019

(65) Prior Publication Data
US 2020/0213452 A1    Jul. 2, 2020

(30) Foreign Application Priority Data
Dec. 26, 2018 (JP) .............................. JP2018-243788

(51) Int. Cl.
*H04N 1/00* (2006.01)

(52) U.S. Cl.
CPC ..... *H04N 1/00029* (2013.01); *H04N 1/00021* (2013.01); *H04N 1/00037* (2013.01); *H04N 1/00076* (2013.01); *H04N 1/00899* (2013.01)

(58) Field of Classification Search
CPC ...................... H04N 1/00029; H04N 1/00021
See application file for complete search history.

(56) References Cited

U.S. PATENT DOCUMENTS

2017/0149990 A1* 5/2017 Saito .................. H04N 1/00514

FOREIGN PATENT DOCUMENTS

JP            2011008418 A        1/2011

* cited by examiner

*Primary Examiner* — Ibrahim Siddo
(74) *Attorney, Agent, or Firm* — Rossi, Kimms & McDowell LLP

(57) ABSTRACT

An information processing apparatus includes a control unit and an operation unit. The control unit is configured to generate image data for image display. The operation unit includes a display unit, and is configured to display a screen on the display unit based on the image data generated by the control unit and to accept user operation. The control unit executes first processing for identifying, based on a state of signal output from the operation unit, whether a malfunction has occurred in one of the control unit and the operation unit. The operation unit executes, independently of the first processing by the control unit, second processing for identifying, based on a state of signal output from the control unit, whether the malfunction has occurred in the control unit or in the operation unit.

26 Claims, 6 Drawing Sheets

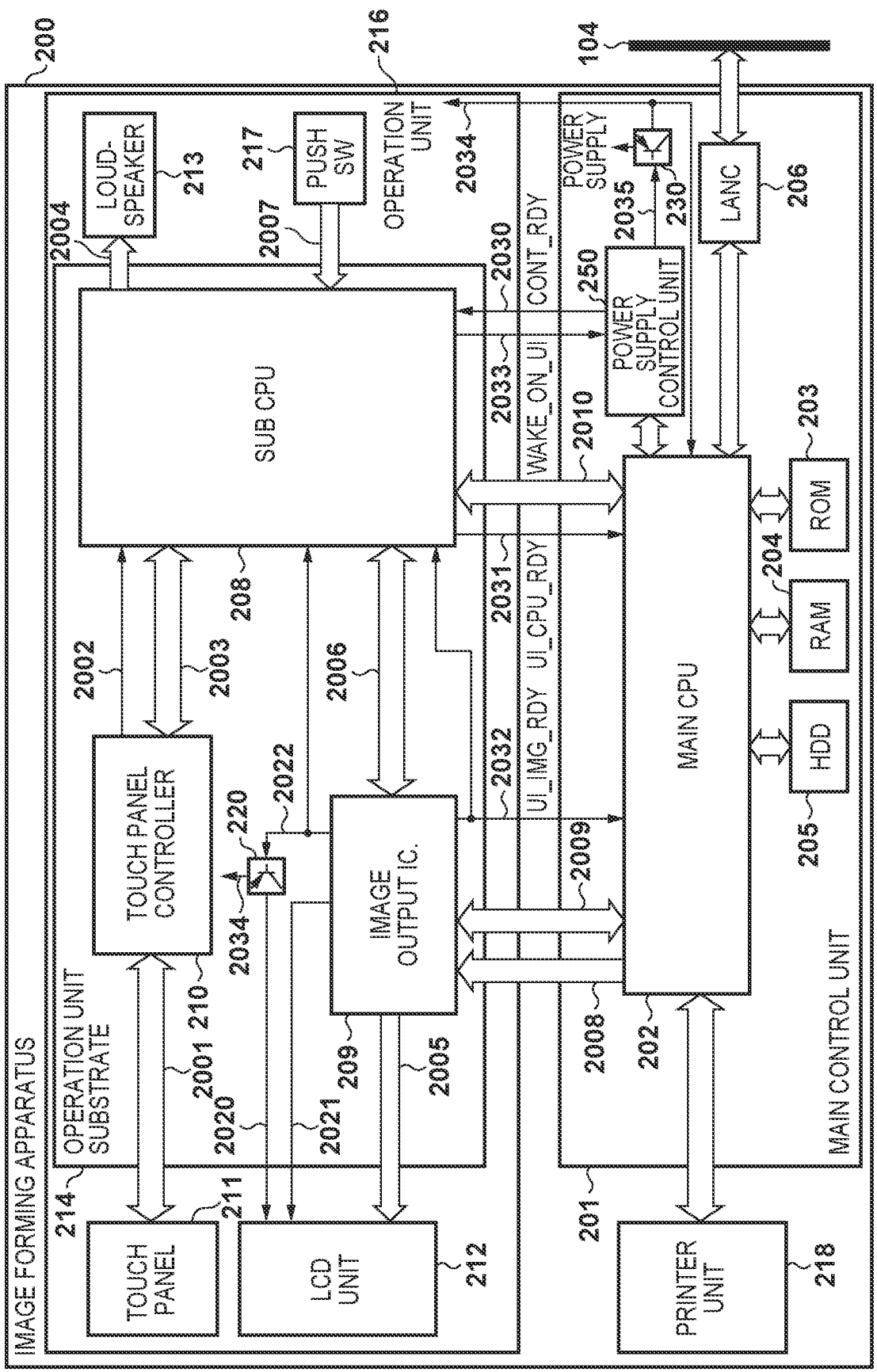

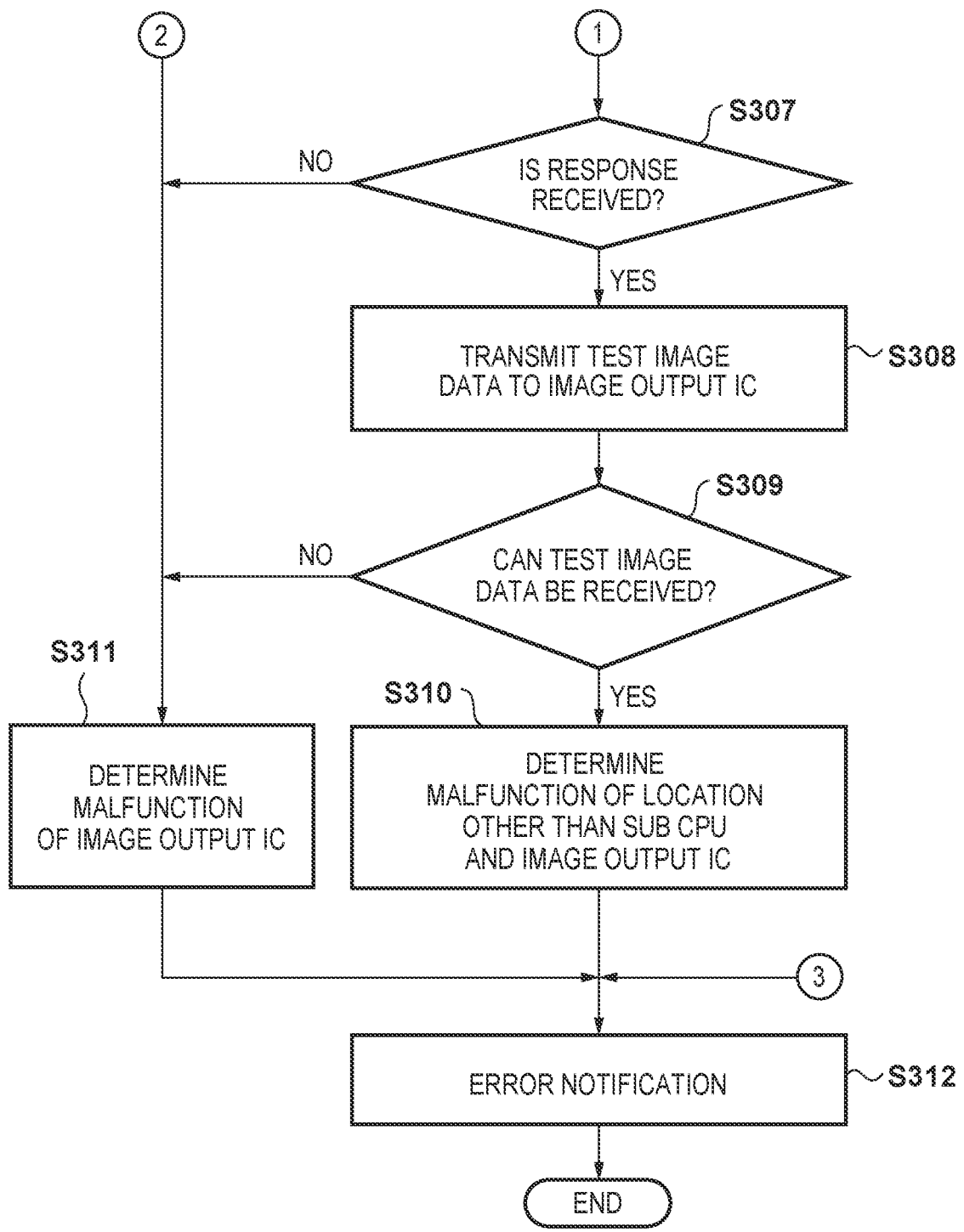

INFORMATION PROCESSING APPARATUS, CONTROL METHOD OF THE SAME, AND STORAGE MEDIUM

BACKGROUND OF THE INVENTION

Field of the Invention

The present invention relates to an information processing apparatus, a control method of the same, and a storage medium.

Description of the Related Art

An information processing apparatus such as an image forming apparatus or the like may include a dedicated operation unit formed by an input device such as a touch panel, a numeric keypad or the like, a display device such as an LCD (liquid crystal display) or the like, and a control substrate incorporating a CPU or the like. The operation unit is configured to receive, from a main control unit, image data generated by the main control unit of the information processing apparatus, and to display the received image data on the screen of the display device. In such an information processing apparatus, if one of the main control unit and the operation unit fails, a malfunction such as a state in which screen display is not performed or a state (freeze state) in which there is no response to an operation made on the input device may occur.

As described above, if an operation malfunction occurs in the information processing apparatus, it is desirable to quickly identify the malfunctioning (failing) unit among the plurality of units forming the information processing apparatus, and to perform a recovery operation on the identified unit to shorten the downtime. As a technique of identifying the location of the failure, Japanese Patent Laid-Open No. 2011-8418 discloses a technique in which a failure in a motherboard (main control unit) is detected by setting the motherboard as the monitoring-target circuit. In this technique, an image signal output from the motherboard is used in a display operation if the failure of the motherboard is not detected, and an image signal pre-stored in a storage unit is used for the display operation if the failure of the motherboard is detected. A user is notified of the failure of the motherboard in this manner.

According to the related art described above, although it is possible to detect the failure of the main control unit in the information processing apparatus, it impossible to identify whether the failure occurred in the main control unit or in the operation unit, in a case where a state in which an image display is not performed in the operation unit or a freeze state has occurred. For example, there may be a case in which it is impossible discriminate between a state in which the main control unit is not outputting image data to the operation unit and a state in which the display device of the operation unit cannot display the screen even if the image data is being output. Also, in a case where the freeze state has occurred, it may be impossible to discriminate between a state in which the operation unit cannot transmit a notification to the main control unit and a state in which the main control unit cannot respond even if it has received a notification from the operation unit. In these cases, the downtime may be prolonged because it may take time to identify the location of the failure in the information processing apparatus.

SUMMARY OF THE INVENTION

The present invention provides a technique that allows a malfunctioning unit to be identified quickly in a case where a malfunction related to an operation unit has occurred in an information processing apparatus.

According to one aspect of the present invention, there is provided an information processing apparatus comprising: a control unit configured to generate image data for image display; and an operation unit which includes a display unit, and configured to display a screen on the display unit based on the image data generated by the control unit and to accept user operation, wherein the control unit executes first processing for identifying, based on a state of signal output from the operation unit, whether a malfunction has occurred in one of the control unit and the operation unit, and the operation unit executes, independently of the first processing by the control unit, second processing for identifying, based on a state of signal output from the control unit, whether the malfunction has occurred in the control unit or in the operation unit.

According to another aspect of the present invention, there is provided a method of controlling an information processing apparatus that comprises: a control unit configured to generate image data for image display; and an operation unit which includes a display unit, and configured to display a screen on the display unit based on the image data generated by the control unit and to accept user operation, the method comprising: executing, by the control unit, first processing for identifying, based on a state of signal output from the operation unit, whether a malfunction has occurred in one of the control unit and the operation unit, and executing by the operation unit independently of the first processing by the control unit, second processing for identifying, based on a state of signal output from the control unit, whether the malfunction has occurred in the control unit or in the operation unit.

According to still another aspect of the present invention, there is provided a computer-readable storage medium storing a computer program for causing a computer to execute a method of controlling an information processing apparatus that comprises: a control unit configured to generate image data for image display; and an operation unit which includes a display unit, and configured to display a screen on the display unit based on the image data generated by the control unit and to accept user operation, the method comprising: executing, by the control unit, first processing for identifying, based on a state of signal output from the operation unit, whether a malfunction has occurred in one of the control unit and the operation unit, and executing by the operation unit independently of the first processing by the control unit, second processing for identifying, based on a state of signal output from the control unit, whether the malfunction has occurred in the control unit or in the operation unit.

Further features of the present invention will become apparent from the following description of exemplary embodiments (with reference to the attached drawings).

BRIEF DESCRIPTION OF THE DRAWINGS

FIG. 2 is a block diagram showing an example of the hardware arrangement of an image forming apparatus.

FIGS. 3A and 3B are flowcharts showing the procedure of failure diagnosis processing executed by a main control unit.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<System Arrangement>

Figure 1:
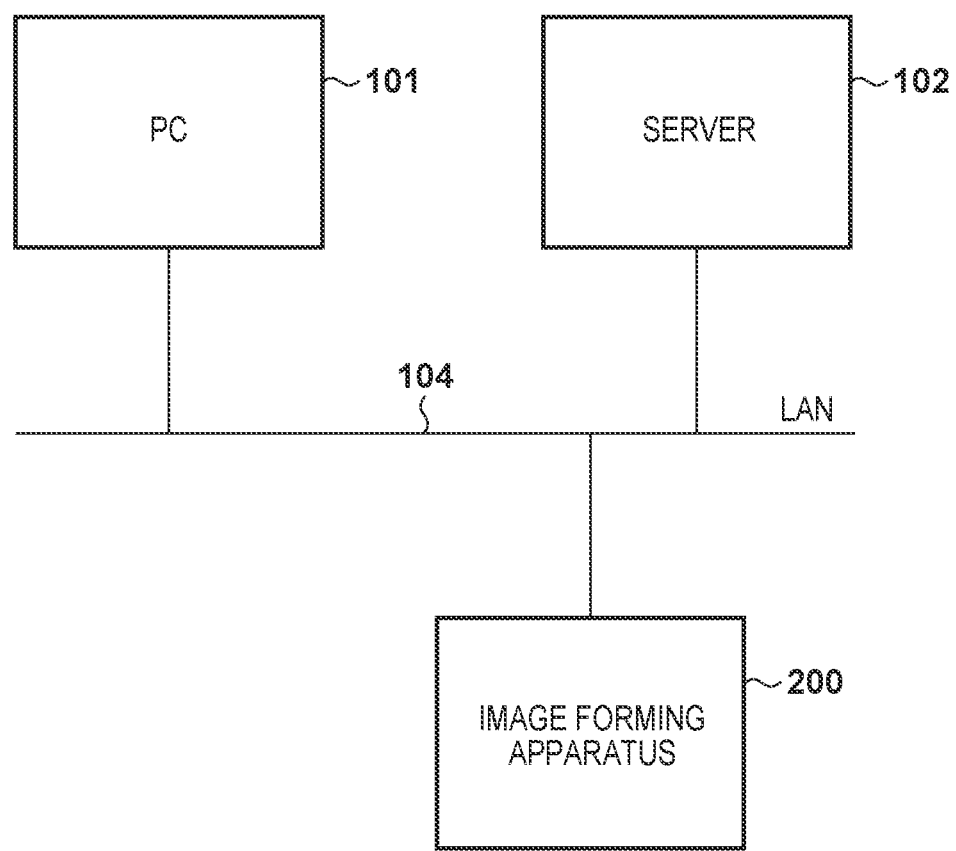
FIG. 1 is a block diagram showing an example of the arrangement of an image forming system.

FIG. 1 is a block diagram showing an example of the arrangement of an image forming system according to an embodiment of the present invention. This embodiment will describe, as an example of an information processing apparatus, an example in which the present invention is applied to an image forming apparatus that performs image formation. Note that the present invention is applicable as long as the information processing apparatus is an information processing apparatus that includes a control unit which generates image data for image display and an operation unit which includes a display unit, displays a screen on the display unit based on the image data generated by the control unit, and accepts a user operation. For example, the present invention is also applicable to an information processing apparatus such as a printing apparatus, a scanning apparatus, a copy machine, a facsimile apparatus, or the like.

In a system shown in FIG. 1, a PC (personal computer) 101, a server 102, and an image forming apparatus 200 are connected to a LAN 104. The server 102 is a computer that provides a service in accordance with a request from a client apparatus such as the PC 101, the image forming apparatus 200 or the like.

The PC 101 or the server 102 generates a print job that includes data of a specific data format (which has been compressed by JBIG or the like) or data written in accordance with an operation by a user in a print language such as PDL or the like. The PC 101 or the server 102 transmits the generated print job to the image forming apparatus 200 via the LAN 104. Upon receiving the print job from an external apparatus such as the PC 101 or the server 102, the image forming apparatus 200 executes image formation (printing) in accordance with the received print job.

The PC 101 or the server 102 can remotely access the image forming apparatus 200 via the LAN 104. The PC 101 or the server 102 is configured to be able to operate the image forming apparatus 200 and to monitor the state of the image forming apparatus 200 by remote access. In addition, the image forming apparatus 200 is configured to be able to notify the external apparatus such as the PC 101 or the server 102 of its own state.

<Arrangement of Image Forming Apparatus>

FIG. 2 is a block diagram showing an example of the hardware arrangement of the image forming apparatus 200. The image forming apparatus 200 includes a main control unit 201, an operation unit 216, a printer unit 218, and a scanner unit (not shown).

The main control unit 201 includes a main CPU 202 (a first CPU) and controls the overall image forming apparatus 200. The operation unit 216 functions as a user interface (UI) and includes a sub CPU 208 (a second CPU), an input device (a touch panel 211) which accepts a user operation, and a display device (an LCD unit 212) which displays a screen. In this embodiment, the main control unit 201 functions as an example of a control unit that generates image data for image display and outputs the generated image data to the operation unit 216. The operation unit 216 functions as an example of an operation unit that includes the LCD unit 212 (display unit), displays a screen on the LCD unit 212 (display unit) based on the image data generated by the main control unit 201, and accepts a user operation. The printer unit 218 performs image formation processing on a sheet-like print medium (print sheet) in accordance with, for example, an electrophotographic method. Note that the printer unit 218 may adopt, not limited to the electrophotographic method, another printing method such as an inkjet method, a thermal transfer method, or the like.

The main control unit 201 includes the main CPU 202, a ROM 203, a RAM 204, an HDD 205, a LANC (LAN controller) 206, a SW (switch) 230, and a power supply control unit 250. The main control unit 201 implements a print function by controlling the printer unit 218 to print an image in accordance with a print job received from, for example, an external apparatus. The main control unit 201 also implements a copy function by controlling the scanner unit and the printer unit 218 to print an image based on image data obtained by reading an original image by the scanner unit.

The main CPU 202 controls the overall image forming apparatus 200. The main CPU 202 reads out and executes programs stored in the ROM 203 or the HDD 205 to implement functions such as the print function, copy function, and the like of the image forming apparatus 200. The RAM 204 is formed from a volatile memory such as a DDR SDRAM or the like. The RAM 204 is used to store a program to be executed by the main CPU 202 and temporary data to be used by the main CPU 202. The HDD 205 is a storage device connected to the main CPU 202 by, for example, a serial ATA. The HDD 205 is used to temporarily store various kinds of setting information related to the image forming apparatus 200 and image data to be used in the print function or the copy function. The LANC 206 is connected to the main CPU 202 and the LAN 104. The LANC 206 controls the communication with an external apparatus such as the PC 101 or the server 102 performed via LAN 104.

The image forming apparatus 200 according to this embodiment has, as operation modes, a power-saving mode and a standby mode. In the standby mode, power is supplied from a power supply (not shown) to the main CPU 202, and the main CPU 202 is in an operable state. In the power-saving mode, power is not supplied from the power supply to the main CPU 202, and the main CPU 202 is not in an operable state. The power-saving mode is an operation mode in which the image forming apparatus 200 consumes less power than in the standby mode. Note that supply of power to devices such as the printer unit 218, the scanner unit, and the like is also stopped in power-saving mode. Note that the power supply (not shown) of the image forming apparatus 200 is arranged in the main control unit 201 in this embodiment.

The power supply control unit 250 performs power supply control for the entire image forming apparatus 200. The power supply control unit 250 performs control to turn on or off the power supply arranged in the main control unit 201 of the image forming apparatus 200 in a case where power is not supplied to the main CPU 202 and the printer unit 218. The main CPU 202 performs control to turn on or off the power supply to each unit by controlling the power supply control unit 250 in a case where power is supplied to the main CPU 202 and the printer unit 218. Note that the power supply control performed by the power supply control unit 250 may be implemented by causing the CPU of the power supply control unit to execute a program or may be implemented by hardware logic such as a PLD (Programmable Logic Device).

The power supply control unit 250 switches the power supply of the image forming apparatus 200 from the OFF state to the ON state upon receiving, as a trigger, a WAKE_ON_UI signal 2033 from the sub CPU 208 or a WAKE signal (not shown) from the LANC 206. As a result, the power supply control unit 250 shifts the image forming apparatus 200 from the power-saving mode to the standby mode. Furthermore, the power supply control unit 250 controls supply of power to the operation unit 216 by using a power supply control signal 2035 to control the SW 230. Power 2034 is not supplied to the operation unit 216 if the SW 230 is set to the OFF state, and the power 2034 is supplied to the operation unit 216 if the SW 230 is set to the ON state.

The operation unit 216 is connected to the main control unit 201 via signal lines for an image data signal 2008, a control signal 2009, and a control signal 2010. Furthermore, the operation unit 216 is connected to the main control unit 201 via signal lines for a CONT_RDY signal 2030, a UI_CPU_RDY signal 2031, a UI_IMG_RDY signal 2032, and the WAKE_ON_UI signal 2033.

The CONT_RDY signal 2030 is a signal which indicates the operation mode of the main control unit 201 and which is output from the power supply control unit 250 to the sub CPU 208 in a case where power is supplied to the main CPU 202. The UI_CPU_RDY signal 2031 is a signal which indicates that the sub CPU 208 is in an operable state (a state in which it can receive the control signal 2010). The UI_IMG_RDY signal 2032 is a signal which indicates that an image output IC 209 is in a state in which it can receive the control signal 2009 and the image data signal 2008. The WAKE_ON_UI signal 2033 is a signal to make the main control unit 201 (the image forming apparatus 200) return from the sleep state (power-saving mode), and is transmitted from the sub CPU 208 to the power supply control unit 250.

In the failure diagnosis processing to be described later, the main control unit 201 (the main CPU 202) detects a malfunction that has occurred in the operation unit 216 based on whether or not a signal which indicates the operation state of the operation unit 216 is output from the operation unit 216. On the other hand, in the failure diagnosis processing to be described later, the operation unit 216 (the sub CPU 208) detects a malfunction that has occurred in the main control unit 201 based on whether or not a signal indicating the operation state of the main control unit 201 and a control signal are output from the main control unit 201. In this embodiment, each of the UI_CPU_RDY signal 2031 and the UI_IMG_RDY signal 2032 is an example of a signal that indicates the operation state of the operation unit 216, and the CONT_RDY signal 2030 is an example of a signal that indicates the operation state of the main control unit 201.

The operation unit 216 receives an instruction or information from the main control unit 201 and performs display control of the LCD unit 212, via the image data signal 2008, the control signal 2009, and the control signal 2010. The operation unit 216 also notifies, via the control signal 2010, the main control unit 201 of the user operation accepted via the touch panel 211.

The operation unit 216 (the sub CPU 208) determines (discriminates) the current operation mode of the main control unit 201 by monitoring the CONT_RDY signal 2030. More specifically, the operation unit 216 determines whether the current operation mode of the main control unit 201 is the power-saving mode or the standby mode.

On the other hand, the main CPU 202 determines, by monitoring the UI_CPU_RDY signal 2031, whether or not the sub CPU 208 is in an operable state (a state in which it can receive the control signal 2010). Furthermore, the main CPU 202 determines, by monitoring the UI_IMG_RDY signal 2032, whether or not the image output IC 209 is in a state in which it can receive the control signal 2009 and the image data signal 2008.

The operation unit 216 includes an operation unit substrate 214, the touch panel 211, the LCD unit 212, loudspeaker 213, and a push SW 217. The sub CPU 208, a touch panel controller 210, and the image output IC 209 are mounted on the operation unit substrate 214.

The touch panel controller 210 is connected to the sub CPU 208 and the touch panel 211. The touch panel controller 210 exchanges a control signal 2001 with the touch panel 211. Also, the touch panel controller 210 exchanges an interrupt signal 2002 and a control signal 2003 with the sub CPU 208.

The sub CPU 208 transmits setting information to the touch panel controller 210 via the control signal 2003. The sub CPU 208 also receives, from the touch panel controller 210 via the control signal 2003, input operation data corresponding to the user input operation accepted by the touch panel 211. Furthermore, the sub CPU 208 receives, from the touch panel controller 210 via the interrupt signal 2002, information indicating the change in the user input made on the touch panel 211. The sub CPU 208 transmits, to the main CPU 202 via the control signal 2010, the input operation data received from the touch panel controller 210.

The image output IC 209 is connected to the LCD unit 212 and is an IC for controlling image display by the LCD unit 212. That is, the image output IC 209 functions as an example of an image output circuit that generates an image signal for image display and outputs it to the LCD unit 212, based on the image data received from the main control unit 201. The image output IC 209 controls the LCD unit 212 by using an image output signal 2005 and a backlight control signal 2021. The backlight control signal 2021 is used for executing ON/OFF control (lighting control) on the backlight of the LCD unit 212, for setting the brightness, and the like. In addition, the image output IC 209 controls a SW 220 by using a power supply control signal 2022 for the LCD unit 212, so as to control supply of power to the LCD unit 212. In a case where the SW 220 is in the OFF state, power 2020 is not supplied to the LCD unit 212. In a case where the SW 220 is in the ON state, the power 2020 is supplied to the LCD unit 212.

The image output IC 209 is also connected to the main CPU 202 and the sub CPU 208. The image output IC 209 exchanges a control signal 2006 with the sub CPU 208. The image output IC 209 also exchanges the image data signal 2008, the control signal 2009, and the UI_IMG_RDY signal 2032 with the main CPU 202. The UI_IMG_RDY signal 2032 is a signal which is output from the image output IC 209 to the main CPU 202, and used to transmit a notification indicating whether or not the image output IC 209 can receive the control signal 2009 and the image data signal 2008.

The signal line for the power supply control signal 2022 output from the image output IC 209 is connected not only to the SW 220 but also to the sub CPU 208 so that the sub CPU 208 can monitor the power supply control signal 2022. In addition, the signal line for the UI_IMG_RDY signal 2032 output from the image output IC 209 is connected not only to the main CPU 202 but also to the sub CPU 208 so that the sub CPU 208 can monitor the UI_IMG_RDY signal 2032. The sub CPU 208 monitors the power supply control signal 2022 and the UI_IMG_RDY signal 2032 to identify the location of a failure.

The main CPU 202 transmits the image data of a screen to be displayed on the LCD unit 212 as the image data signal 2008 to the image output IC 209 mounted on the operation unit substrate 214. The main CPU 202 uses the control signal 2009 to transmit, to the image output IC 209, setting information for setting of the image display such as setting of the size or the orientation of the screen to be displayed on the LCD unit 212.

The image output IC 209 generates an image signal that can be received by the LCD unit 212, based on the image data received as the image data signal 2008 and the setting information received as the control signal 2009 from the main CPU 202. The image output IC 209 transmits the generated image signal as the image output signal 2005 to the LCD unit 212. For example, the image output IC 209 generates, as an image signal that can be received by the LCD unit 212, an LVDS (low voltage differential signaling) signal or an analog or digital RGB signal. The LCD unit 212 displays a screen in accordance with the image output signal 2005 received from the image output IC 209.

In addition, the image output IC 209, upon entering a state in which it can perform image output to the LCD unit 212 after receiving the image data and the setting information from the main CPU 202, the image output IC 209 uses the power supply control signal 2022 to set the SW 220 to be the ON state. As a result, the image output IC 209 starts supplying of the power 2020 to the LCD unit 212.

The sub CPU 208 performs, for the image output IC 209 via the control signal 2006, the ON/OFF control (lighting control) of the backlight of the LCD unit 212 and setting for brightness and the like. The sub CPU 208 uses a control signal 2004 to control the loudspeaker 213. For example, the sub CPU 208 can cause the loudspeaker 213 to output a push sound indicating the acceptance of a user input and a voice indicating information such as an operation instruction to the user, the state of the image forming apparatus 200, or the like. Note that the control of the loudspeaker 213 may be performed by the main CPU 202 instead of the sub CPU 208.

The push SW 217 is connected to the sub CPU 208 and is an operation button used by a user or a service person to make an instruction to shift the operation mode to a failure diagnosis mode. If the push SW 217 is operated (pressed) by the user or the service person, the push SW 217 will output a user input signal 2007 to the sub CPU 208. Upon receiving the user input signal 2007, the sub CPU 208 will notify, via the control signal 2010, the main CPU 202 of the operation of the push SW 217.

<Failure Diagnosis Mode>

In this embodiment, the main control unit 201 (the main CPU 202) and the operation unit 216 (the sub CPU 208) have the failure diagnosis mode for identifying the location of a malfunction when a malfunction related to the operation unit 216 has occurred. The main CPU 202 and the sub CPU 208 each will execute the failure diagnosis processing (to be described later) upon shifting to the failure diagnosis mode.

The main CPU 202 will shift to the failure diagnosis mode in a case where the image forming apparatus 200 is remotely accessed from an external apparatus such as the PC 101 or the server 102 via the LAN 104 and is instructed to shift to the failure diagnosis mode by the external apparatus. The main CPU 202 may also shift to the failure diagnosis mode in a case where the user or the service person has made an instruction to shift the operation mode to the failure diagnosis mode. Alternatively, the main CPU 202 may shift itself to the failure diagnosis mode by predicting the occurrence of a failure based on the operation state of the touch panel 211 and the LCD unit 212.

The instruction from the user or the service person is implemented by some kind of action from the user or the service person. For example, such an instruction may be made by pressing the push SW 217 for the failure diagnosis. Alternatively, such an instruction may be made by operating a specific key or making an operation of a specific pattern on a numeric keypad (not shown) unit, or activating the image forming apparatus 200 in a state where a key operation has been made at a specific time. If the push SW 217 is pressed, a notification of the pressing of the push SW 217 (that is, the shift instruction to the failure diagnosis mode) is transmitted from the sub CPU 208 to the main CPU 202, and the main CPU 202 shifts to the failure diagnosis mode.

In addition, the sub CPU 208 shifts to the failure diagnosis mode if the main CPU 202 has instructed the shift to the failure diagnosis mode. As described above, upon receiving a failure diagnosis mode shift instruction from an external apparatus by remote access, the main CPU 202 will shift to the failure diagnosis mode as well as instruct the sub CPU 208 to shift to the failure diagnosis mode. In addition, if the push SW 217 for the failure diagnosis is pressed, the sub CPU 208 will notify the main CPU 202 of this pressing operation in the manner described above and shift to the failure diagnosis mode.

In this manner, the main CPU 202 and the sub CPU 208 are controlled so that one CPU shifting to the failure diagnosis mode will cause the other CPU to shift to the failure diagnosis mode as well. As a result, unless one of the CPUs is in an inoperable state due to a malfunction, the failure diagnosis processing will be performed in both the main CPU 202 (the main control unit 201) and the sub CPU 208 (the operation unit 216).

More specifically, the main control unit 201 executes failure diagnosis processing (first processing) to identify, based on the state of signal output from the operation unit 216, whether the malfunction occurred in the main control unit 201 or in the operation unit 216. On the other hand, the operation unit 216 executes, independently of the failure diagnosis processing executed by the main control unit 201, failure diagnosis processing (second processing) to identify, based on the state of signal output from the main control unit 201, whether the malfunction occurred in the main control unit 201 or in the operation unit 216.

Figure 3A:
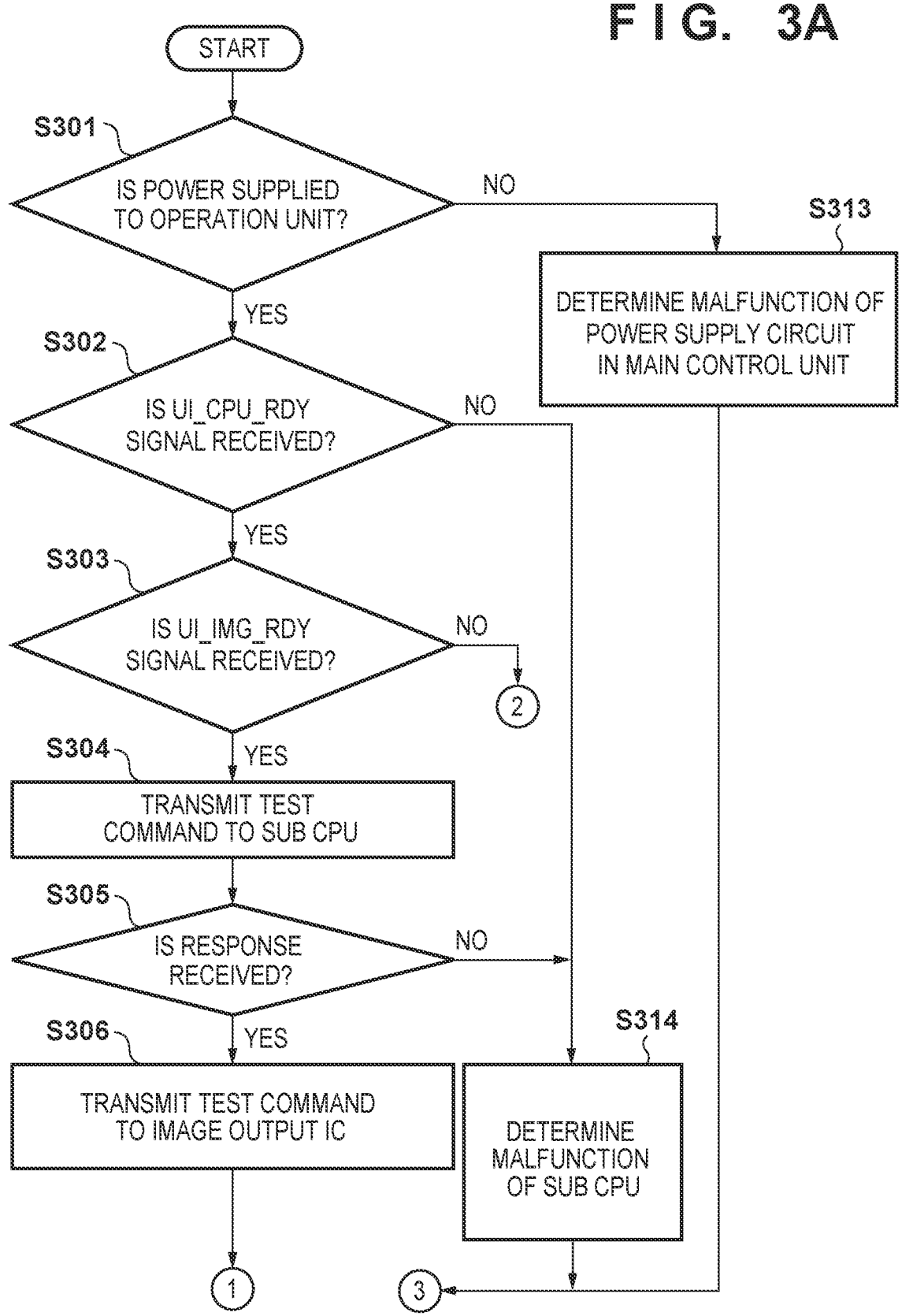

In this embodiment, upon shifting to the failure diagnosis mode, the main CPU 202 executes the failure diagnosis processing (the first processing) in accordance with the procedure exemplified in FIGS. 3A and 3B. Also, upon shifting to the failure diagnosis mode, the sub CPU 208 executes the failure diagnosis processing (the second processing) in accordance with the procedure exemplified in FIGS. 4 and 5. In a case where a malfunction in which the image forming apparatus 200 does not respond (the image forming apparatus 200 is in a freeze state) to a user operation made on the operation unit 216 has occurred, the sub CPU 208 will execute the failure diagnosis processing shown in FIG. 4. On the other hand, in a case where a malfunction in which image display is not performed by the LCD unit 212 has occurred, the sub CPU 208 will execute failure diagnosis processing in which a block 500 shown in FIG. 4 has been replaced by a block 500 shown in FIG. 5. Note that which of the failure diagnosis processing operations should be executed by the sub CPU 208 may be instructed by, for example, an external apparatus by remote access. In addition, the sub CPU 208 may execute both of these failure diagnosis processing operations in accordance with the shift to the failure diagnosis mode.

<Failure Diagnosis Processing by Main CPU>

A more specific example of the failure diagnosis processing executed by the main CPU 202 will be described with reference to the flowcharts of FIGS. 3A and 3B. The process performed in each step shown in FIGS. 3A and 3B can be implemented by the main CPU 202 reading out and executing a program stored in the ROM 203 or the HDD 205.

In step S301, the main CPU 202 determines whether or not the power 2034 is supplied from the power supply to the operation unit 216. If the power 2034 is supplied to the operation unit 216, the main CPU 202 advances the process to step S302. If the power 2034 is not supplied, the main CPU 202 advances the process to step S313. In step S313, the main CPU 202 determines that a malfunction has occurred in the power supply (power supply circuit) for generating the power 2034 in the main control unit 201, and advances the process to step S312.

In step S302, the main CPU 202 determines whether or not the UI_CPU_RDY signal 2031 has been output (received) from the operation unit 216 (the sub CPU 208). If the UI_CPU_RDY signal 2031 has been output, the main CPU 202 advances the process to step S303. Otherwise, the main CPU 202 advances the process to step S314. In step S314, the main CPU 202 determines that a malfunction has occurred in the sub CPU 208 of the operation unit 216, and advances the process to step S312.

In step S303, the main CPU 202 determines whether or not the UI_IMG_RDY signal 2032 has been output (received) from the operation unit 216 (the image output IC 209). If the UI_IMG_RDY signal 2032 has been output, the main CPU 202 advances the process to step S304. Otherwise, the main CPU 202 advances the process to step S311. In step S311, the main CPU 202 determines that a malfunction has occurred in the image output IC 209 of the operation unit 216, and advances the process to step S312.

In step S304, the main CPU 202 will transmit a test command to the sub CPU 208 via the control signal 2010. Furthermore, in step S305, the main CPU 202 determines whether or not the sub CPU 208 has responded to the test command transmitted in step S304. If there is a response from the sub CPU 208, the main CPU 202 advances the process to step S306. If there is no response, the main CPU 202 advances the process to step S314. In step S314, the main CPU 202 determines that a malfunction has occurred in the sub CPU 208 of the operation unit 216, and advances the process to step S312.

In step S306, the main CPU 202 transmits a test command to the image output IC 209 via the control signal 2009. Furthermore, in step S307, the main CPU 202 determines whether or not the image output IC 209 has responded to the test command transmitted in step S306. If there is a response from the image output IC 209, the main CPU 202 advances the process to step S308. If there is no response, the main CPU 202 advances the process to step S311. In step S311, the main CPU 202 determines that a malfunction has occurred in the image output IC 209 of the operation unit 216, and advances the process to step S312.

In step S308, the main CPU 202 transmits test image data as the image data signal 2008 to the image output IC 209, and advances the process to step S309. In step S309, the main CPU 202 transmits an inquiry to the sub CPU 208, via the control signal 2010, as to whether or not the image output IC 209 has been able to receive the test image data transmitted in step S308.

The sub CPU 208 determines whether or not the image output IC 209 has been able to receive the test image data by monitoring the power supply control signal 2022, which is output from the image output IC 209. In addition, the sub CPU 208 notifies the main CPU 202 of the determination result as a response to the inquiry. The main CPU 202 performs the determination in step S308 based on the notification from the sub CPU 208.

In step S309, if the main CPU 202 determines that the image output IC 209 has been able to receive the test image data transmitted in step S308, it advances the process to step S310. If the main CPU 202 determines that the image output IC has not been able to receive the test image data, it advances the process to step S311. In step S311, the main CPU 202 determines that a malfunction has occurred in the image output IC 209 of the operation unit 216, and advances the process to step S312. On the other hand, in step S310, the main CPU 202 determines that a malfunction has occurred in a location (the LCD unit 212, the touch panel 211, the touch panel controller 210, or the like) other than the image output IC 209 and the sub CPU 208 in the operation unit 216, and advances the process to step S312.

In step S312, the main CPU 202 stores information related to the location of the malfunction determined in step S310, step S311, step S313, or step S314 as an error history in the HDD 205, and performs malfunction location notification (error notification). For example, the main CPU 202 transmits an error notification to an external apparatus such as the PC 101 or the server 102 via the LANC 206 and the LAN 104. Alternatively, if no malfunction has occurred in the image output IC 209 and the LCD unit 212, the main CPU 202 may perform error notification by displaying the location of the malfunction on the LCD unit 212. In this manner, the main CPU 202 notifies the user or a service person of information which indicates the location determined to be the location of the malfunction in the main control unit 201 or the operation unit 216, by transmitting the information to an external apparatus or displaying the information on the LCD unit 212. After the error notification has been completed, the main CPU 202 ends the processing performed in accordance with the procedure shown in FIGS. 3A and 3B.

<Failure Diagnosis Processing by Sub CPU (Case of Freeze State)>

Figure 4:
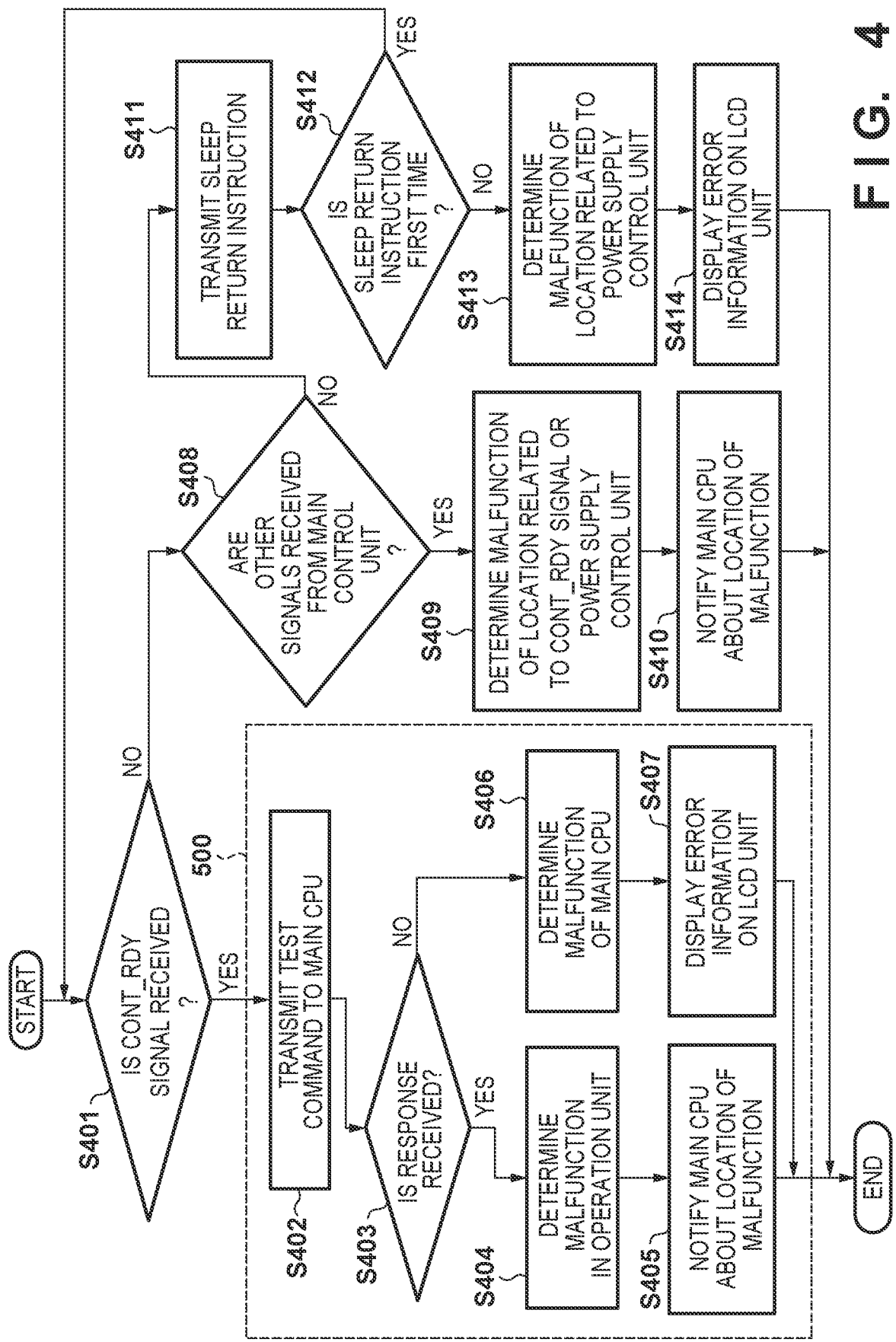
FIG. 4 is a flowchart showing the procedure of the failure diagnosis processing executed by an operation unit.

A more specific example of the failure diagnosis processing executed by the sub CPU 208 in a case where the image forming apparatus 200 does not respond (is in a freeze state) to the user operation performed on the operation unit 216 will be described with reference to the flowchart of FIG. 4. In this example, the sub CPU 208 detects a malfunction in the main control unit 201 based on the output state of the CONT_RDY signal 2030 indicating the operation mode of the main control unit 201 and that of the control signal from the main CPU 202. Also, the sub CPU 208 detects a malfunction in the main control unit 201 and the operation unit 216 by transmitting a test command to the main CPU 202.

First, in step S401, the sub CPU 208 determines whether or not the CONT_RDY signal 2030 has been output (received) from main control unit 201. If the CONT_RDY signal 2030 has been output, the sub CPU 208 advances the process to step S402. Otherwise, the sub CPU 208 advances the process to step S408.

In step S402, the sub CPU 208 transmits a test command to the main CPU 202 via the control signal 2010. Furthermore, in step S403, the sub CPU 208 determines whether or not the main CPU 202 has responded to the test command transmitted in step S402. If there is a response from the main CPU 202, the sub CPU 208 advances the process to step S404. If there is no response, the sub CPU 208 advances the process to step S406.

In step S404, the sub CPU 208 determines that a malfunction has occurred in the operation unit 216 (for example, a malfunction in the touch panel controller 210, the touch panel 211, or the signal line between them). This is because there is no malfunction in the power supply control unit 250 which outputs the CONT_RDY signal 2030, and there is also no problem with the communication with the main CPU 202 via the control signal 2010 (that is, there is no malfunction in the main CPU 202). Subsequently, in step S405, the sub CPU 208 notifies, via the control signal 2010, the main CPU 202 of the location of the malfunction determined in step S404, and ends the process.

On the other hand, in step S406, the sub CPU 208 determines that the main CPU 202 is in a state (abnormal state) in which a malfunction such as freezing or the like has occurred. This is because the sub CPU has not received a response from the main CPU 202 in the communication with the main CPU 202 via the control signal 2010 (that is, a malfunction has occurred in the main CPU 202). Subsequently, in step S407, the sub CPU 208 instructs the image output IC 209 to display the error information indicating that a malfunction has occurred in the main CPU 202 on the LCD unit 212, and ends the process.

In a case where the process is advanced from step S401 to step S408, the sub CPU 208 determines, in step S408, whether or not signals (that is, the control signal 2009 and 2010) other than the CONT_RDY signal 2030 have been output (received) from the main control unit 201. If the other signals have been output from the main control unit 201, the sub CPU 208 advances the process to step S409.

In step S409, the sub CPU 208 determines that no malfunction has occurred in the main CPU 202 of the main control unit 201 and a malfunction has occurred in a location related to the CONT_RDY signal 2030 or the power supply control unit 250. This is because, while the CONT_RDY signal 2030 (related to the power supply control unit 250) is not being output normally, other signals (that is, the control signals 2009 and 2010 related to the main CPU 202) are being output normally. Subsequently, in step S410, the sub CPU 208 notifies, via the control signal 2010, the main CPU 202 of the malfunction determined in step S409, and ends the process.

On the other hand, as a result of the determination performed in step S408, if the sub CPU 208 determines that the other signals have not been output from the main control unit 201, it advances the process to from step S408 to step S411. In this case, the main control unit 201 may be in the sleep state (the power-saving mode). Hence, in step S411, the sub CPU 208 tries to make the main control unit 201 return from the power-saving mode by using the WAKE_ON_UI signal 2033 to transmit, to the power supply control unit 250, a sleep return instruction to return the main control unit from the sleep state. Subsequently, in step S412, the sub CPU 208 returns the process to step S401 if it is the first time that the sleep return instruction in step S411 has been performed, and confirms the signal output from the main control unit 201 again in steps S401 and S408. On the other hand, the sub CPU 208 advances the process to step S413 if it is not the first time that the sleep return instruction in step S411 has been performed. In this manner, the sub CPU 208 advances the process to step S413 in a case where the CONT_RDY signal 2030 has not been output from the power supply control unit 250 and the control signals have not been output from the main CPU 202 after the return instruction has been transmitted.

In step S413, the sub CPU 208 determines that a malfunction has occurred in the power supply control unit 250 or in a location related to the power supply control unit 250 in the main control unit 201. This is because the sleep return instruction made in step S411 has not caused the main control unit 201 to return from the sleep state. Subsequently, in step S414, the sub CPU 208 instructs the image output IC 209 to display, on the LCD unit 212, the error information indicating that a malfunction has occurred in a location related to the power supply control unit 250, and ends the process. In this manner, in step S405, step S407, step S410, or step S414, the sub CPU 208 performs a notification by transmitting to the main CPU 202 or displaying on the LCD unit 212 the information indicating the location where the occurrence of a malfunction has been determined in the main control unit 201 or the operation unit 216.

<Failure Diagnosis Processing by Sub CPU (Case Without Screen Display)>

Figure 5:
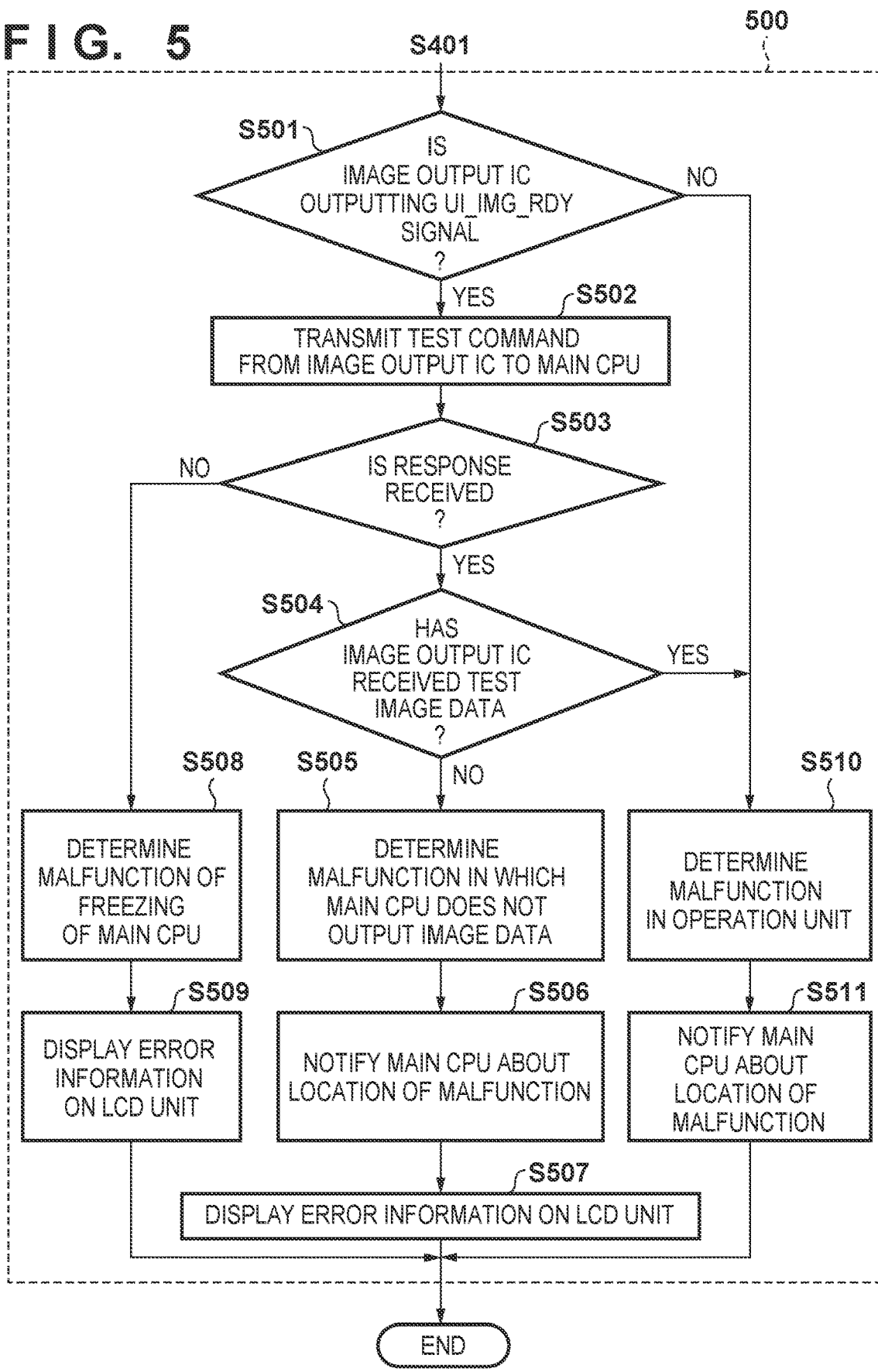
FIG. 5 is a flowchart showing the procedure of the failure diagnosis processing executed by an operation unit.

A more specific example of the failure diagnosis processing executed by the sub CPU 208 in a case where image display is not performed on the LCD unit 212 will be described next with reference to the flowcharts of FIGS. 4 and 5. In this example, the block 500 (steps S402 to S407) in the flowchart shown in FIG. 4 is replaced by the block 500 (steps S501 to S511) shown in FIG. 5.

First, in step S401, the sub CPU 208 determines whether or not the CONT_RDY signal 2030 has been output (received) from the main control unit 201. If the CONT_RDY signal 2030 has not been output, the sub CPU 208 advances the process to step S408. The processes of steps S408 to S414 are similar to those of the processing described above. On the other hand, if the CONT_RDY signal 2030 has been output, the sub CPU 208 advances the process to step S501 (FIG. 5).

In step S501, the sub CPU 208 determines whether or not the image output IC 209 is outputting the UI_IMG_RDY signal 2032. If the UI_IMG_RDY signal 2032 is being output, the image output IC 209 is in a state in which it can receive the control signal 2009 and the image data signal 2008. If the image output IC 209 is outputting the UI_IMG_RDY signal 2032, the sub CPU 208 advances the process to step S502, and otherwise, it advances the process to step S510.

In step S510, the sub CPU 208 determines that a malfunction (for example, a malfunction in the image output IC 209 or the LCD unit 212) has occurred in the operation unit 216. This is because, for example, a case in which the UI_IMG_RDY signal is not output due to the occurrence of a malfunction in the image output IC 209 or a case in which image display cannot be performed on the LCD unit 212 even if the image output IC 209 is able to receive the image data signal 2008 can be expected. Subsequently, in step S511, the sub CPU 208 notifies, via the control signal 2010, the main CPU 202 of the malfunction determined in step S510, and ends the process.

On the other hand, in step S502, the sub CPU 208 instructs the image output IC 209 to use the control signal 2009 to transmit a test command to the main CPU 202, and advances the process to step S503. Note that the instruction from the sub CPU 208 to the image output IC 209 is performed by using the control signal 2006. The test command transmitted from the image output IC 209 in step S502 includes an instruction indicating that a response be transmitted via the control signal 2009 and test image data be transmitted via the image data signal 2008.

In step S503, the sub CPU 208 makes an inquiry to the image output IC 209 by using the control signal 2006, so as to determine whether or not the main CPU 202 has responded to the test command transmitted in step S502. If there is a response from the main CPU 202, the sub CPU 208 advances the process to step S504, and if there is no response, it advances the process to step S508.

In step S508, the sub CPU 208 determines that a malfunction in which freezing of the main CPU 202 has occurred because the main CPU 202 has not responded to the test command. Subsequently, in step S509, the sub CPU 208 instructs the image output IC 209 to display, on the LCD unit 212, the error information indicating the freezing of the main CPU 202, and ends the process.

On the other hand, in step S504, the sub CPU 208 determines whether or not the image output IC 209 has received test image data from the main CPU 202. In this case, upon receiving the test image data from the main CPU 202 and entering a state in which it can output an image to the LCD unit 212, the image output IC 209 uses the power supply control signal 2022 to set the SW 220 to be ON state. Hence, the sub CPU 208 can determine, by monitoring the power supply control signal 2022 output from the image output IC 209, whether or not the image output IC 209 has received the test image data from the main CPU 202.

In step S504, if the sub CPU 208 determines that the image output IC 209 has not received the test image data from the main CPU 202 (that is, the test image data has not been transmitted from the main CPU 202), it advances the process to step S505. In step S505, the sub CPU 208 determines that a malfunction in which the main CPU 202 does not output image data (does not output the image data signal 2008) has occurred. Subsequently, in step S506, the sub CPU 208 notifies, via the control signal 2010, the main CPU 202 of the malfunction determined in step S506, and advances the process to step S507. In step S507, the sub CPU 208 instructs the image output IC 209 to display, on the LCD unit 212, the error information indicating that image data has not been output from the main CPU 202, and ends the process.

On the other hand, in step S504, if the sub CPU 208 determines that the image output IC 209 has received the test image data from the main CPU 202 (that is, the test image data has been transmitted from the main CPU 202), it advances the process to step S510. As described above, the sub CPU 208 determines, in step S510, that a malfunction (for example, a malfunction in the image output IC 209 or the LCD unit 212) has occurred in the operation unit 216. Furthermore, in step S511, the sub CPU 208 notifies the main CPU 202 of the malfunction determined in step S510, and ends the process. In this manner, in step S506, step S507, step S509, or step S511, the sub CPU 208 performs a notification, by transmitting to the main CPU 202 or displaying on the LCD unit 212, of the information indicating the location where the occurrence of a malfunction has been determined in the main control unit 201 or the operation unit 216.

As described above, in the image forming apparatus 200 according to this embodiment, the main control unit 201 executes the failure diagnosis processing (the first processing) for identifying whether the malfunction occurred in the main control unit 201 or in the operation unit 216 based on the state of signal output from the operation unit 216. The operation unit 216, independently of the failure diagnosis processing by the main control unit 201, executes the failure diagnosis processing (the second processing) for identifying whether the malfunction occurred in the main control unit 201 or in the operation unit 216 based on the state of signal output from the main control unit 201. In this manner, in a case where a malfunction related to the operation unit 216 has occurred, the unit in which the malfunction has occurred can be quickly identified by executing the failure diagnosis processing independently in each of the main control unit 201 and the operation unit 216. In addition, the downtime until the image forming apparatus 200 recovers can be reduced by notifying the user or the service person of the location of the malfunction that has been identified.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-243788, filed on Dec. 26, 2018, which is hereby incorporated by reference herein in its entirety.

What is claimed is:

1. An information processing apparatus comprising:
a control unit configured to generate image data for image display; and
an operation unit which includes a display unit, and configured to display a screen on the display unit based on the image data generated by the control unit and to accept user operation,
wherein the control unit executes first processing for identifying, based on a state of signal output from the operation unit, whether a malfunction has occurred in one of the control unit and the operation unit, and
the operation unit executes, independently of the first processing by the control unit, second processing for identifying, based on a state of signal output from the control unit, whether the malfunction has occurred in the control unit or in the operation unit.

2. The apparatus according to claim 1, wherein the first processing and the second processing are started in accordance with one of a user instruction made via the operation unit and a user instruction from an external apparatus.

3. The apparatus according to claim 1, wherein the first processing and the second processing are started by predicting an occurrence of a malfunction related to the operation unit from an operation state of the operation unit.

4. The apparatus according to claim 1, wherein
the control unit detects, in the first processing, the malfunction in the operation unit based on whether or not a signal indicating an operation state of the operation unit is output from the operation unit, and
the operation unit detects, in the second processing, the malfunction in the control unit based on whether or not a signal indicating an operation state of the control unit and a control signal are output from the control unit.

5. The apparatus according to claim 1, wherein
the control unit includes a first CPU,
the operation unit includes a second CPU, and
the first CPU determines, in the first processing, that a malfunction has occurred in the second CPU if a signal indicating that the second CPU is in an operable state is not output from the second CPU.

6. The apparatus according to claim 5, wherein
the operation unit includes an image output circuit configured to generate, based on the image data received from the control unit, an image signal for image display and to output the generated image signal to the display unit, and
the first CPU determines, in the first processing, that a malfunction has occurred in the image output circuit if a signal indicating that the image data can be received by the image output circuit is not output from the image output circuit.

7. The apparatus according to claim 5, wherein in the first processing, the first CPU transmits a test command to the second CPU and determines that a malfunction has occurred in the second CPU if there is no response from the second CPU to the test command.

8. The apparatus according to claim 5, wherein
the operation unit includes an image output circuit configured to generate, based on the image data received from the control unit, an image signal for image display and to output the generated image signal to the display unit, and
in the first processing, the first CPU transmits a test command to the image output circuit and determines that a malfunction has occurred in the image output circuit if there is no response from the image output circuit to the test command.

9. The apparatus according to claim 8, wherein
in the first processing, the first CPU transmits, to the image output circuit, the test command via a first signal line and if receiving, from the image output circuit, a response to the test command, the first CPU transmits test image data to the image output circuit via a second signal line and makes an inquiry to the second CPU as to whether or not the image output circuit has been able to receive the test image data, and
in response to the inquiry from the first CPU, the second CPU determines, based on a state of a control signal output from the image output circuit, whether or not the image output circuit has been able to receive the test image data, and the second CPU transmits, to the first CPUS, a determination result as a response to the inquiry, and
the first CPU determines, based on the response received from the second CPU, whether or not a malfunction has occurred in the image output circuit.

10. The apparatus according to claim 9, wherein
the image output circuit outputs, upon entering a state in which the image signal to the display unit can be output, a power supply control signal to set supply of power to the display unit to be an ON state, and
the second CPU determines, based on a state of the power supply control signal output from the image output circuit, whether or not the image output circuit has been able to receive the test image data.

11. The apparatus according to claim 5, wherein in the first processing, the first CPU determines whether or not power is supplied to the operation unit from a power supply provided in the control unit, and determines that a malfunction has occurred in the power supply if the power is not supplied from the power supply to the operation unit.

12. The apparatus according to claim 5, wherein the first CPU notifies a user of information, indicating a location determined to be a location where a malfunction has occurred in one of the control unit and the operation unit, by transmitting the information to an external apparatus or displaying the information on the display unit.

13. The apparatus according to claim 1, wherein
the control unit includes a first CPU,
the operation unit includes a second CPU, and
the second CPU detects, in the second processing, a malfunction in the control unit based on an output state of a first signal indicating an operation mode of the control unit and an output state of a second signal which is a control signal from the first CPU.

14. The apparatus according to claim 13, wherein
the control unit includes a power supply control unit configured to control supply of power from a power supply provided in the control unit,
the first signal is a signal output from the power supply control unit, and
the second CPU determines, in the second processing, that a malfunction has not occurred in the first CPU of the control unit if the first signal is not output from the power supply control unit and the second signal is output from the first CPU.

15. The apparatus according to claim 14, wherein the second CPU determines, in the second processing, that a malfunction has occurred in one of the power supply control unit and a location related to the power supply control unit of the control unit, if the first signal is not output from the power supply control unit and the second signal is not output from the first CPU.

16. The apparatus according to claim 14, wherein
in a case where the first signal is not output from the power supply control unit and the second signal is not output from the first CPU, the second CPU tries to cause the control unit to return from a power-saving mode by transmitting to the power supply control unit a return instruction to return from the power-saving mode, and
in a case where, after the transmission of the return instruction, the first signal is not output from the power supply control unit and the second signal is not supplied from the first CPU, the second CPU determines that a malfunction has occurred in one of the power supply control unit and a location related to the power supply control unit of the control unit.

17. The apparatus according to claim 14, wherein the second CPU transmits a test command to the first CPU if the first signal is output from the power supply control unit, and determines that a malfunction has occurred in the first CPU if there is no response from the first CPU to the test command.

18. The apparatus according to claim 17, wherein the second CPU determines that a malfunction has occurred in the operation unit if the second CPU receives, from the first CPU, a response to the test command.

19. The apparatus according to claim 14, wherein
the operation unit includes an image output circuit configured to generate, based on image data received from the control unit, an image signal for image display, and to output the generated image output signal to the display unit, and
the second CPU determines that a malfunction has occurred in the operation unit if the first signal is output from the power supply control unit and a third signal indicating that the image output circuit can receive the image data is not output from the image output circuit to the first CPU.

20. The apparatus according to claim 19, wherein the second CPU causes the image output circuit to transmit a test command to the first CPU if the first signal is output from the power supply control unit and the third signal is output from the image output circuit to the first CPU, and the second CPU determines that a malfunction in which freezing of the first CPU has occurred if there is no response from the first CPU to the test command.

21. The apparatus according to claim 20, wherein
the second CPU causes the image output circuit to transmit, to the first CPU, the test command which includes an instruction indicating that test image data is to be transmitted to the image output circuit, and
the second CPU determines that a malfunction in which the first CPU does not output image data has occurred if the image output circuit cannot receive the test image data.

22. The apparatus according to claim 21, wherein the second CPU determines, based on a state of a control signal output from the image output circuit, whether or not the image output circuit has been able to receive the test image data.

23. The apparatus according to claim 22, wherein
the image output circuit outputs, upon entering a state in which the image signal to the display unit can be output, a power supply control signal to set supply of power to the display unit to be an ON state, and
the second CPU determines, based on a state of the power supply control signal output from the image output circuit, whether or not the image output circuit has been able to receive the test image data.

24. The apparatus according to claim 13, wherein the second CPU performs notification by transmitting to the first CPU, or displaying on the display unit, information indicating a location determined to be a location where a malfunction has occurred in one of the control unit and the operation unit.

25. A method of controlling an information processing apparatus that comprises: a control unit configured to generate image data for image display; and an operation unit which includes a display unit, and configured to display a screen on the display unit based on the image data generated by the control unit and to accept user operation, the method comprising:
executing, by the control unit, first processing for identifying, based on a state of signal output from the operation unit, whether a malfunction has occurred in one of the control unit and the operation unit, and
executing by the operation unit independently of the first processing by the control unit, second processing for identifying, based on a state of signal output from the control unit, whether the malfunction has occurred in the control unit or in the operation unit.

26. A non-transitory computer-readable storage medium storing a computer program for causing a computer to execute a method of controlling an information processing apparatus that comprises: a control unit configured to generate image data for image display; and an operation unit which includes a display unit, and configured to display a screen on the display unit based on the image data generated by the control unit and to accept user operation, the method comprising:
executing, by the control unit, first processing for identifying, based on a state of signal output from the operation unit, whether a malfunction has occurred in one of the control unit and the operation unit, and
executing by the operation unit independently of the first processing by the control unit, second processing for identifying, based on a state of signal output from the control unit, whether the malfunction has occurred in the control unit or in the operation unit.

* * * * *